Jan. 10, 1939.  V. H. SEVERY  2,143,114
STROBOSCOPIC TUNING APPARATUS
Filed Nov. 1, 1937  6 Sheets-Sheet 2
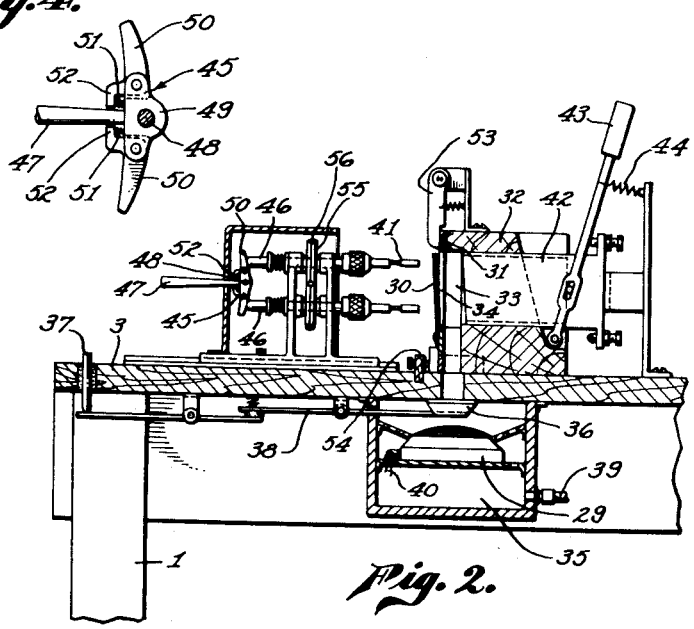
Fig. 4.
Fig. 2.
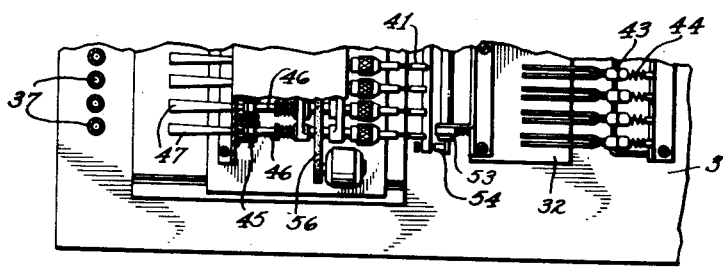
Fig. 3.
Inventor
Victor H. Severy
By Lyon & Lyon
Attorneys Inventor
Victor H. Severy Jan. 10, 1939.  V. H. SEVERY  2,143,114
STROBOSCOPIC TUNING APPARATUS
Filed Nov. 1, 1937  6 Sheets-Sheet 5

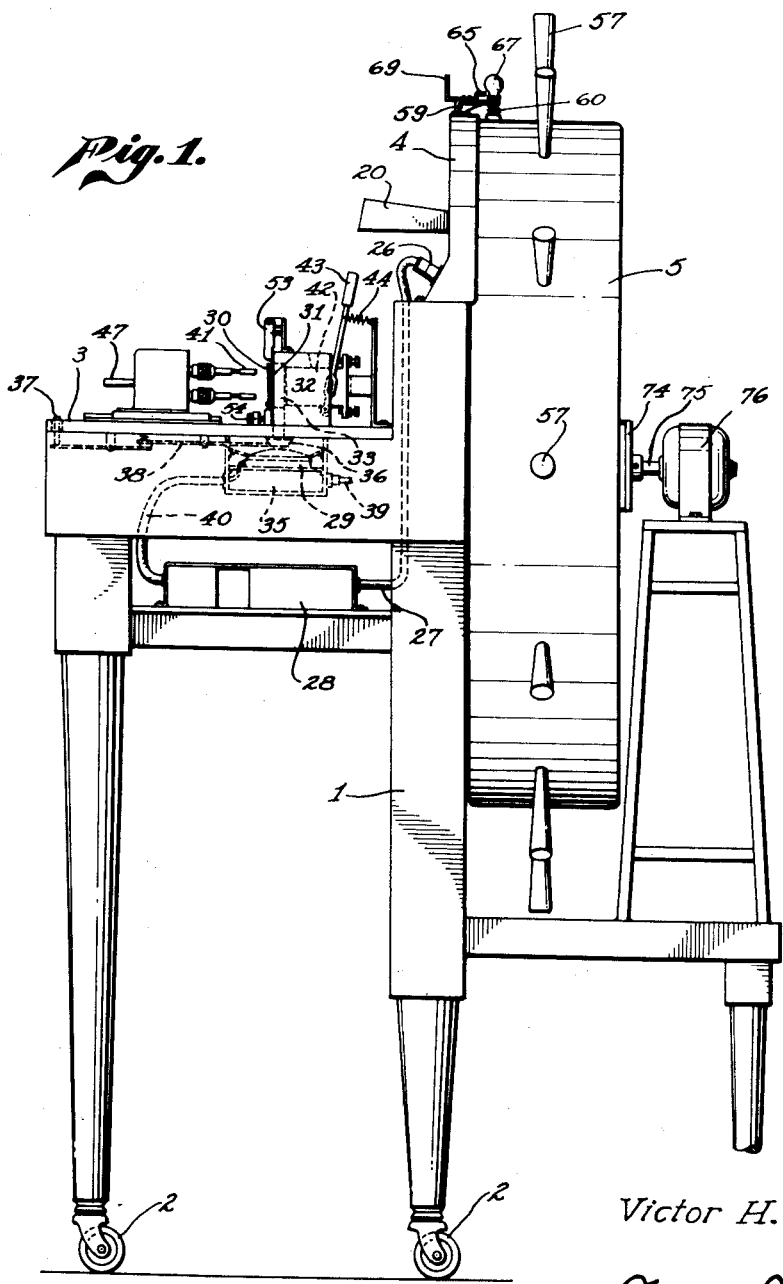

Inventor
Victor H. Severy

By Lyon & Lyon
Attorneys

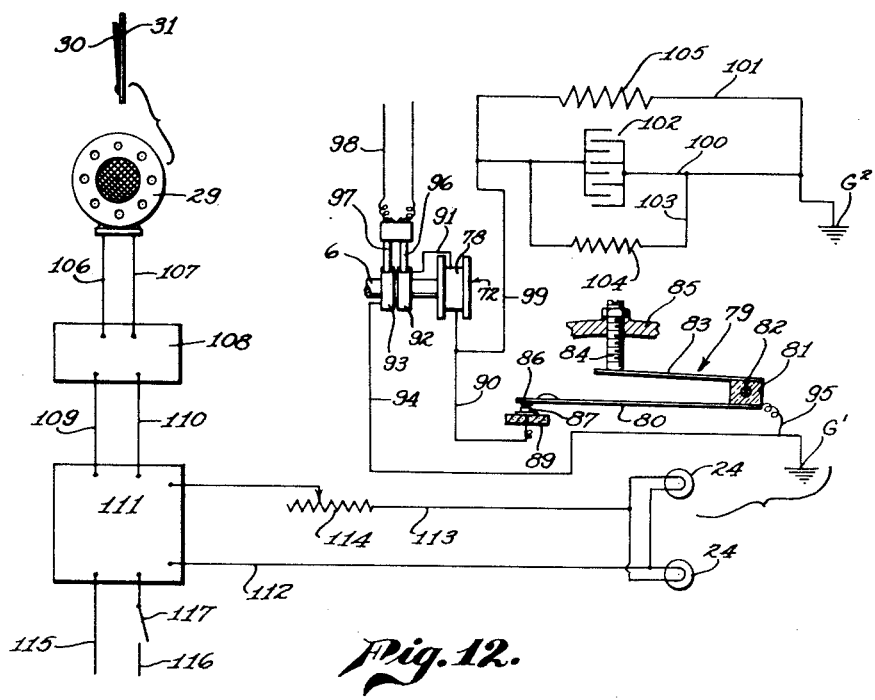
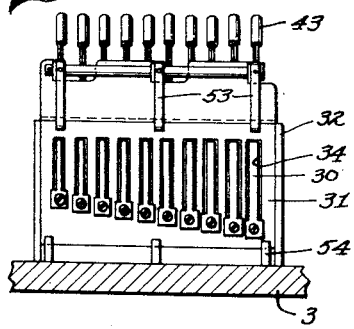
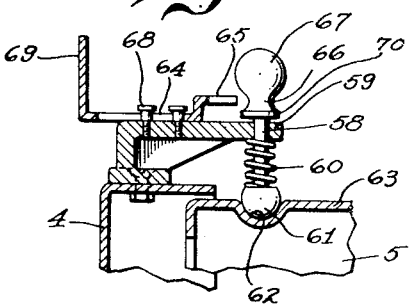
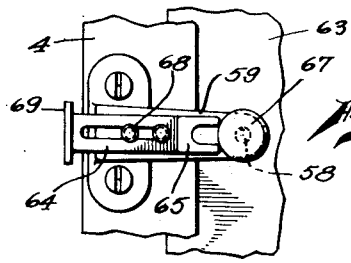
Fig. 12.
Fig. 9.
Fig. 10.
Fig. 11.
Inventor
Victor H. Severy Patented Jan. 10, 1939

2,143,114

UNITED STATES PATENT OFFICE 2,143,114

STROBOSCOPIC TUNING APPARATUS

Victor H. Severy, Berwyn, Ill.

Application November 1, 1937, Serial No. 172,288

9 Claims. (Cl. 84—454)

This invention relates to a stroboscopic tuning apparatus for tuning vibrators of musical instruments, and while the invention may be employed for tuning instruments of any kind, it is intended to be used particularly for tuning the reeds of reed instruments, such as harmonicas.

An object of the invention is to provide simple apparatus for indicating by visual means whether a vibrator or reed is in tune.

In the preferred embodiment of the invention a plurality of rotary members are employed having circumferentially spaced divisions, and means is provided for rotating the same at different speeds so that the divisions of the different rotary members may be caused to pass an observation point at a frequency which is the same as a certain note of the musical scale; and one of the objects of the invention is to provide simple and compact apparatus for enabling an alignment to be established between the eye piece at the observation point and the different rotary members.

A further object of the invention is to provide simple means for illuminating the rotary member that is being observed at an observation point by flashes at a frequency which is the same as that of the vibrator that is to be tuned, thereby enabling the frequency of vibration of the vibrator to be compared with the standard; that is to say, with the vibration frequency that the vibrator should have if in tune.

Further objects of the invention will appear hereinafter.

The invention consists in the novel parts and combination of parts to be described hereinafter, all of which contribute to produce an efficient stroboscopic tuning apparatus.

A preferred embodiment of the invention is described in the following specification, while the broad scope of the invention is pointed out in the appended claims.

In the drawings:

Fig. 1 is a side elevation of the complete apparatus.

Fig. 2 is a vertical section taken through the forward part of the apparatus, and particularly illustrating the means for mounting the reed plate of a harmonica, and also illustrating an electric pick-up or microphone for developing an impulsive current at the same frequency as the vibrating reed; this view also illustrates the means for operating upon the reed to change its frequency for tuning it; parts of the supporting table or frame are broken away.

Fig. 3 is a plan of one end of the apparatus illustrated in Fig. 2, with certain parts broken away, and further illustrating details of this apparatus.

Fig. 4 is a side elevation upon an enlarged scale, with certain parts broken away and particularly illustrating the means for alternately operating either of the means for abrading or cutting away a portion of the reed to change its period of vibration.

Fig. 9 is a section taken about on the line 9—9 of Fig. 2, and particularly illustrating the reed plate mounted in the reed holder.

Fig. 10 is a fragmentary view, and is a section taken on the line 10—10 of Fig. 5, but upon an enlarged scale, and particularly illustrating details of latching means which I employ for holding the different rotary members or discs opposite the observation point and the eye chute through which the tuner may observe the rotary discs.

Fig. 11 is a plan of the latch illustrated in Fig. 10, with certain parts broken away.

Fig. 12 is a diagrammatic view illustrating the relation of the different parts of the apparatus and the wiring for the same.

Figure 5:
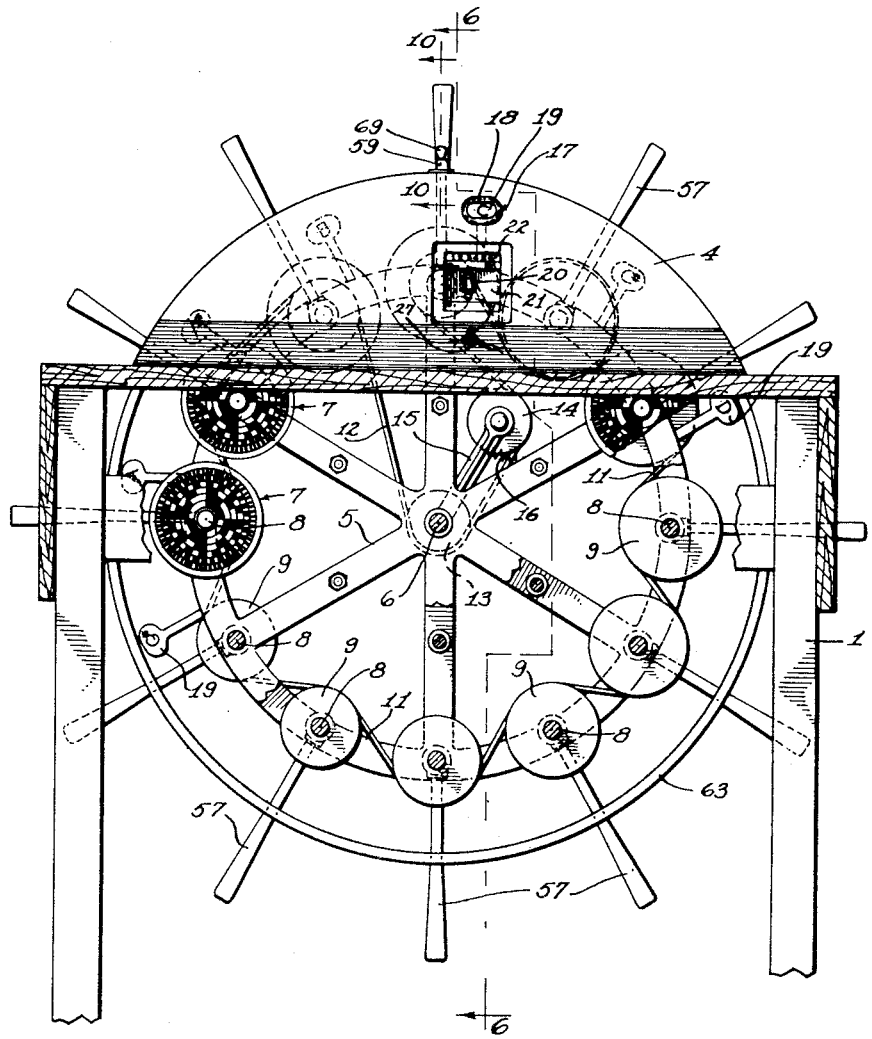
Fig. 5 is a vertical section through the apparatus taken about on the line 5—5 of Fig. 6, with certain parts broken away and with certain parts omitted; this view particularly illustrates the spider and the means for driving the rotary members carried by it.

Before proceeding to a more detailed description of the invention, it should be stated that in practicing the invention, I provide a plurality of rotary members, preferably in the form of discs, the faces of which are divided into circumferential zones, and each zone of each disc is provided with divisions preferably contrasting in appearance. These divisions preferably alternate in color; for example, black alternating with white. These rotary members or discs are driven at different distinctive speeds, that is to say, each disc is driven at a certain speed so that if the disc is held at the observation point, the divisions will pass the observation point at a certain frequency, which is the same as a certain note of the musical scale on which the vibrator or reed is to be tuned. And the construction is such as to enable the eye piece or observation point to be brought into substantial alignment with any one of the rotary members. Each disc will correspond to a certain note in the scale, and the different zones correspond to octaves of the note.

While the apparatus may have any suitable construction for enabling the eye piece or observation point to be brought into alignment with the different discs as suggested above, in the preferred construction of the apparatus the rotary members are in the form of discs mounted upon a spider and disposed in a circumferential arrangement around the axis of the spider. The observation point and the eye piece are relatively fixed on the frame. When an observation is being taken, by rotating the spider by hand, any one of the discs can be brought into alignment with the eye piece and latched in position. Although the eye piece is relatively fixed, nevertheless, it is preferably mounted so that it can be adjusted in a general radial direction with respect to the disc that is under observation during a tuning operation, so as to enable the eye piece to align with any one of the zones on the disc.

The discs preferably have a common driving means, and should be driven in such a way that they will rotate at a substantially uniform speed. In the present instance this is accomplished by driving the discs with an electric motor and through an electric clutch or drive connection controlled by a centrifugal governor and operating so that if the discs rotate too rapidly, the clutch will be affected automatically to reduce the speed of the discs, and vice versa.

Associated with the eye piece, I provide a flashing lamp, which is preferably of neon type, and this lamp is connected up into a circuit carrying an impulsive electric current, preferably an alternating current, and these impulses or alternations of the current have a frequency determined by the natural frequency of vibration of the vibrator or reed that is being tuned. In the present instance, this is accomplished by supporting a reed plate in the vicinity of a suction box, so that when the suction box or vacuum box is in communication with the chamber back of the reed, the reed will be caused to vibrate at its own natural frequency. Associated with the suction box, I provide sound sensitive means preferably in the form of an electrical pick-up or microphone, which is connected into the circuit, and this microphone develops an impulsive electric current having the same frequency as the reed. This impulsive current is amplified so as to develop an alternating current of sufficient voltage to flash the lamp at the peaks of the voltage of the alternating current. In this way the lamp is made to flash at the same frequency as the reed. In other words, it is in time or "in tune" with the reed. With the lamp flashing at a frequency corresponding to a certain reed, the spider is rotated so as to bring the disc that carries a zone corresponding to the note that the reed should have, into alignment with the eye piece. The tuner then with his eye at the eye piece, watches the divisions of the zone of the disc, and the result of his observation will indicate whether the reed is vibrating too fast or too slow to produce the note that it should produce. If the reed is not in tune, then the apparatus mounted on the table of the machine is employed to correct the reed.

Referring more particularly to the parts, 1 indicates a frame of any suitable construction which, in the present instance is mounted on castors 2. At the rear of a table top 3 a segment-form shield 4 is supported, and back of this shield a carrier or spider 5 is mounted to rotate freely on a horizontal shaft 6 (see Fig. 5). On this spider I support a plurality of rotary members preferably in the form of discs indicated generally by the numeral 7, said discs being disposed circumferentially around the spider and carried rigidly on disc shafts 8 rotatably mounted in the spider. Means is provided for driving all of these discs in unison, and for this purpose I prefer to provide driving pulleys 9 rigid with each disc shaft 8, over which an endless driving belt 11 passes, said belt being disposed in a loop 12 extending in to a point near the axis of the spider, and passing around a drive pulley 13 at this point, said drive pulley being rigid on the driving shaft 6. Suitable means is provided for keeping the endless belt 12 tight. For this purpose I provide a belt-tightener which, in the present instance comprises a pulley 14 carried on an arm 15 loose on the shaft 6, and pulled against the belt by means of a coil spring or springs 16.

Figure 7:
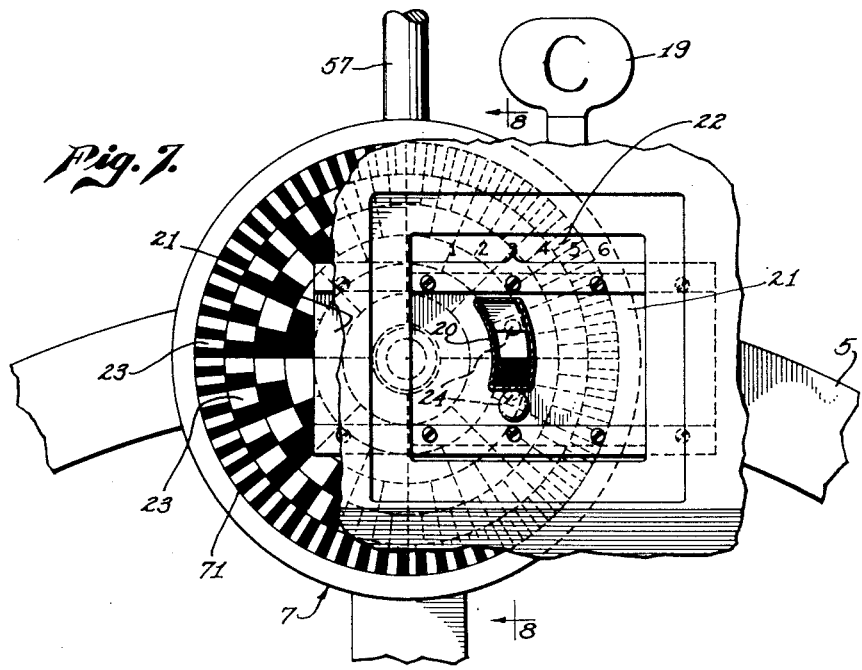
Fig. 7 is a fragmentary detailed view upon an enlarged scale, particularly illustrating one of the rotary discs, and is a front elevation with certain parts broken away and others shown in section; this view particularly illustrates the eye piece and the means for mounting the same to enable it to be aligned with the different zones on the discs.

Referring to Fig. 5, 17 indicates the general location of the observation point, and at this point the shield 4 is preferably provided with a window 18; and when any one of the discs is being held at the observation point, a plate 19 carried on the spider will be presented at this window; and this plate carries a letter, for example, the letter "C" indicating that the disc in this position carries the note "C" and all its octaves, of the musical scale that is being employed. The shield 4 at the observation point is provided with an eye piece 20 preferably in the form of a chute, which is attached to a slide 21, which is guided to slide horizontally in the shield (see Fig. 7), and adjacent to this slide a scale 22 is provided bearing numbers which correspond to the different zones 23 on the disc. As illustrated in Fig. 7, the eye piece 20 is aligned with the second zone of the disc.

Figure 8:
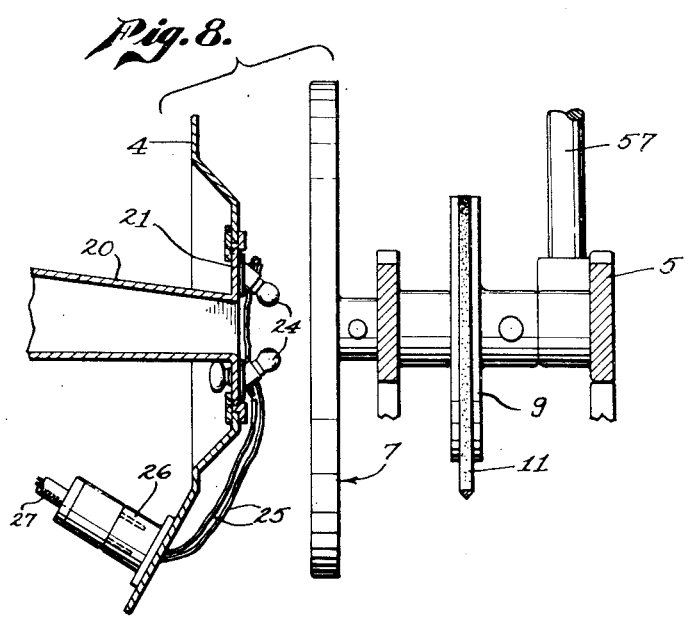
Fig. 8 is a vertical section taken about on the line 8—8 of Fig. 7, with certain parts broken away.

A flashing lamp or lamps are provided for illuminating the zone under observation, and for this purpose I prefer to provide two flashing lamps 24 of neon type (see Fig. 8), which are preferably mounted on the slide 21, which carries the eye piece or chute 20, said lamps being connected up by flexible conductors or cords 25 to a socket 26.

The lamps 24 are connected up into an electric circuit carrying an impulsive current, and preferably an alternating current; and an electric cable 27 is provided leading up from an amplifier box 28 (see Fig. 1) in which current from an electric pick-up device or microphone 29 is amplified so as to flash the lamps by the peaks of the voltage. Any suitable pick-up device may be provided, which will operate to develop an electric current having a frequency the same as the reed or vibrator, which is to be tuned. In the present instance, when tuning a reed 30 of a harmonica, the reed plate 31 is mounted at the forward face of a holder 32 having an air chamber 33 back of the reed plate, and communicating with the slot 34 in which the reed being tuned, is mounted. Below the table top 3 a suction box or vacuum box 35 is provided, and when a reed is being tuned a valve 36 is opened by depressing a plunger 37 at the front of the table, which operates through levers 38 to open the valve. A suction or partial vacuum is maintained in the suction box 35 through a hose 39 connected to an air pump. When the valve 36 is open, air will be drawn in through the reed slot and into the air chamber 33, and thence to the suction box; and this will cause the reed to vibrate. The vibration of the reed, in turn, will cause vibrations in the air in the suction box and surrounding the pick-up device or microphone 29. This microphone 29 is connected by an electric cable 40 with the amplifier box 28.

When it has been determined whether the reed is sharp or flat, a portion of its material may be removed by means of either one of two tools 41 (see Figs. 1 and 2). These tools are continuously driven and are mounted so that either one of them can be advanced to engage the forward face of the reed, while the reed is backed up by a slide block 42 that is slid up against the back of the reed by means of a handle 43, which is normally held attracted by a spring 44. This mechanism illustrated in Fig. 2 constitutes part of the subject matter of my prior application entitled "Tuning apparatus", Serial No. 51,369, filed November 25, 1935.

In order to enable the tools 41 to be pressed by a very delicate pressure against the face of the reed, I prefer to provide a duplex spring pusher 45 for shoving the spindles 46 forwardly. This spring pusher comprises a handle 47 mounted on a horizontal shaft 48, the lever 47 having a head 49 that pivotally carries two pusher fingers 50; the forward edges of these pusher fingers 50 lie against the rear ends of the spindles, and the pushers are urged forwardly by coil springs 51 resting against the tail arms 52 rigid with the fingers 50. With this arrangement it will be evident that when the lever 47 is swung upwardly the upper spindle 46 will be pushed forwardly with a slight yielding pressure, which is exerted through the upper spring 51. If the lever 47 is swung downwardly the spindle 46 of the lower tool will be shoved forwardly with yielding pressure.

The reed plate 31 is held in position on the forward face of the holder by suitable hand-controlled clamps 53 and 54 (see Fig. 2). The spindles 46 of the tools 41 are driven by means of pulleys 55 on the spindles respectively, and carrying an endless driving belt 56.

For convenience in rotating the spider to bring the different discs into alignment with the observation point 17, I prefer to provide an outwardly projecting handle 57 corresponding to each disc, and these handles are, of course, carried on the spider.

Suitable means is provided for latching the spider in the different positions, which will hold the different discs at the observation point. For this purpose a latch such as illustrated in Figs. 10 and 11 may be provided, said latch consisting of a bolt 58 mounted to slide up and down in a bracket 59 fixed to the upper part of the shield and provided with a coil spring 60 that urges the bolt downwardly so as to hold its ball head 61 in a socket 62 formed in the circumferential wall 63 of the spider. This bolt 58 may be latched down by means of a secondary latch 64 in the form of a slide having a yoke 65 that can be shoved over the shank 66 of the ball handle 67 of the bolt. This slide 64 may be guided by means of a pin and slot connection 68 on the bracket 59, and its forward end may be provided with an upwardly projecting handle 69 for moving the slide in or out. This yoke or fork 65 can be used for latching the bolt 58 down, or it may be employed for latching the bolt in a withdrawn position; in the latter case the yoke would be projected under the collar 70 at the base of the ball handle 67.

Referring to the discs 7, and particularly to Fig. 7, it will be noted that each disc is divided into zones 23 already referred to. These zones have equidistant divisions 71, and the areas or divisions contrast with each other; for example, they may be alternately black and white. The innermost zone of a disc, for example, the "C" disc shown in Fig. 7, will correspond to the lowest note C in the musical scale being employed. The next zone corresponding to the No. 2 of the scale 22 will have twice as many divisions so that it will correspond to the first octave of the lowest C of the scale; and so on throughout the entire disc, so that the outermost zone will correspond to the highest C of the scale. Zones with proper divisions may also be provided to produce sharp notes and "flats" for tuning any instrument that has vibrators for producing sharp or flat notes.

Figure 6:
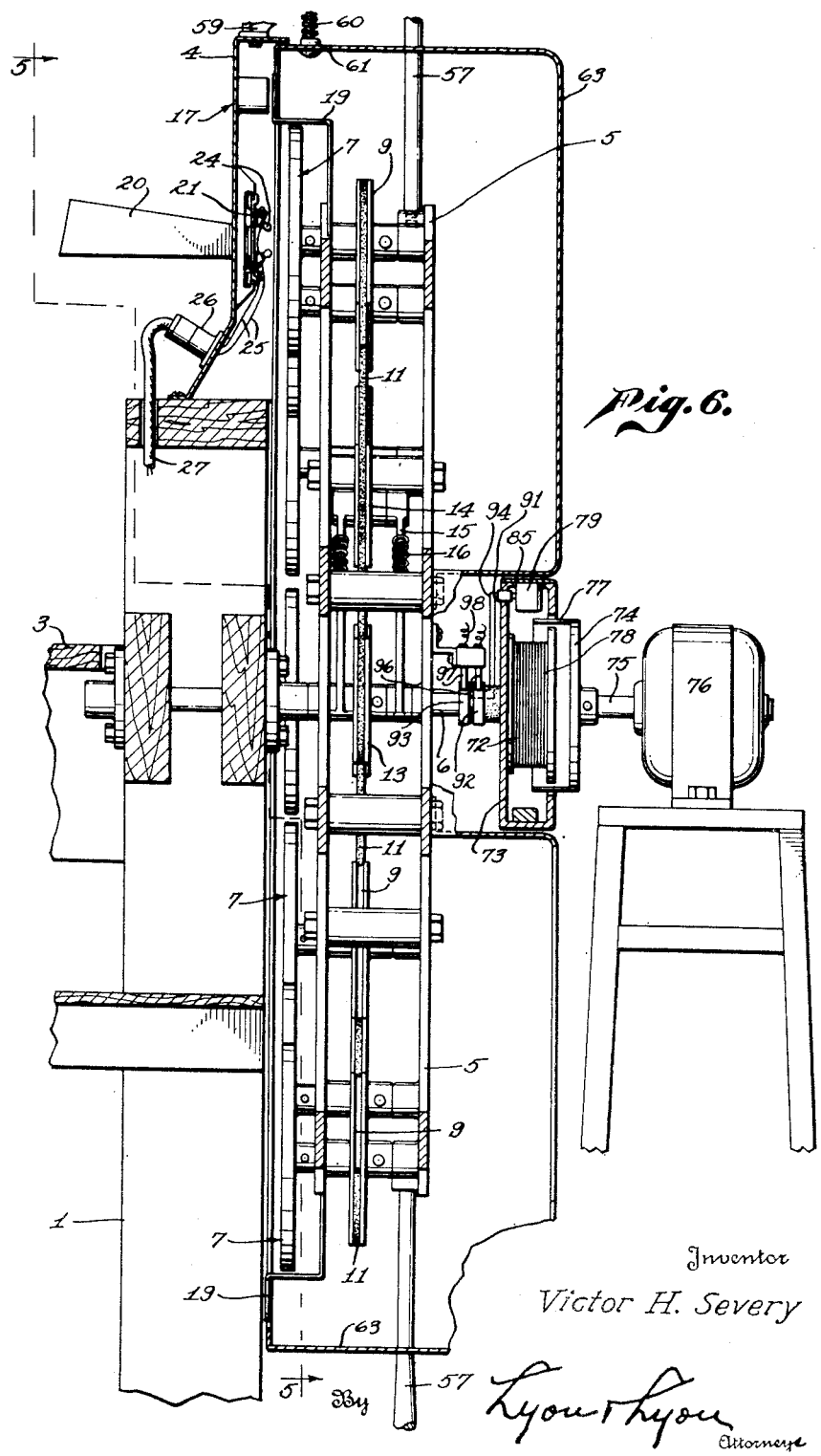
Fig. 6 is a vertical section taken about on the line 6—6 of Fig. 5, with certain parts being broken away, and further illustrating details of the apparatus including the motor and means for driving the apparatus from the motor.

Referring particularly to Figs. 1, 6 and 12, I will now describe the driving means for the discs and the circuit arrangement. The shaft 6 carries an electrical clutch member 72, which is preferably mounted within a hollow fly wheel 73 rigid with the shaft 6 and disposed in alignment with a driving clutch member 74 carried on the shaft 75 of an electric motor 76. The clutch member 74 includes a copper shell 77 that surrounds the outer end of the coil 78 of the driven clutch member 72.

The coil 78 is energized by an electric current flowing in the circuit, and this current is controlled by a centrifugal governor device so as to enable the shaft 6 to be driven at a substantially uniform speed in spite of slight variations which may occur in the revolutions per second of the shaft 75 of the motor. For this purpose the interior of the fly wheel may be provided with a centrifugal governor 79 of any suitable construction. In Fig. 12 I illustrate apparatus which may be employed to form this centrifugal governor, and this apparatus includes a centrifugally controlled contact finger 80, which is secured to a block 81 on a fixed pin 82 within the box, the other side of the said block having a spring finger 83 that seats against a set screw 84 shown in a radial position with respect to the axis of the shaft 6 and passing through the curved plate 85 that carries the centrifugal governor. The contact finger 80 carries a contact 86 at its end to cooperate with a relatively fixed contact 87 that is carried on a fixed part 89 of the governor, but of course, rotating with the fly wheel as it rotates. The contact 87 is connected by a conductor 90 with the coil 78, and a conductor 91 connects the other end of the coil with an insulated slip ring 92 on the shaft 6. A second slip ring 93 is provided, and a conductor 94 leads from this slip ring and is grounded on the metal of the fly wheel at the ground G'. The block 81 is insulated, or is an insulating block, and the relatively fixed end of the contact finger 80 is connected by a conductor 95 to the grounded conductor 94.

Brushes 96 and 97 are provided corresponding to the two slip rings 92 and 93, and these brushes are connected to circuit wires 98 carrying alternating current.

Suitable means may be provided for preventing sparking at the contacts 86 and 87, and for this purpose I have illustrated a conductor 99 leading off from the conductor 90 and leading current in parallel through two conductors 100 and 101 grounded at the ground G²; the conductor 100 including a condenser 102 with a by-pass conductor 103 carrying a resistance 104 for leakage around the condenser. The conductor 101 also carries a resistance 105.

Referring still to Fig. 12, it will be noted that the electric pick-up or microphone 29 is connected by circuit wires 106 and 107 with a preamplifier 108 from which conductors 109 and 110 lead to an amplifier 111. The output side of the amplifier 111 is connected by conductors 112 and 113 to the neon lamps 24, the conductor 113 preferably including a variable resistance 114.

The input terminals of the amplifier are connected to a commercial circuit line through conductors 115 and 116, one of which may include a switch 117.

I will now describe the mode of operation of the entire apparatus.

In tuning a vibrator, for example, a reed 30 of a harmonica, the reed plate 31 is mounted in the holder 32, and the spider 5 is then rotated by hand so as to bring the disc 7 that corresponds to the note of the reed to the observation point 17; for example, as indicated in Fig. 5, the reed being tuned may be assumed to be a reed that should give the note C of the scale. The slide 21 is then moved horizontally if necessary, so as to bring the eye piece 20 into alignment with the zone of the C disc that corresponds to the note and frequency of the note, that this vibrator or reed will produce. It will be evident that on account of the character of the driving mechanism, the spider 5 can be rotated to bring the proper disc to the observation point while the motor is running and while the discs are all rotating at their proper individual speeds. After the eye piece or finder 20 has been brought into alignment with the proper zone of the disc, the tuner presses down on a plunger 37 at the forward edge of the table 3 so as to open the proper valve 36 that corresponds to the particular reed 30 that is being tuned. This will open the air chamber 33 back of the reed 30 to the suction box 35, and an inrush of air past the reed 30 will occur, which will vibrate the reed. These vibrations of the reed are also imparted to the current of air flowing down through the suction box, and will affect the microphone to cause impulsive currents in the circuit wires 106 and 107, which pass to the preamplifier 108 (see Fig. 12). The impulses or alternations in the current passing in the conductors 106 and 107 are amplified by the preamplifier 108, and an amplified current will therefore be developed in the conductors 109 and 110, which lead to the amplifier 111. The amplifier 111 will then cause amplified alternating current to flow in the conductors 112 and 113 leading the current through the neon lamps 24. This will cause the lamps to flash at a frequency, which is the same as the frequency of the vibrating reed 30. The tuner will then apply his eye to the eye piece or finder 20, and observe the divisions on the zone of the disc that are passing the eye piece. If the reed is in tune so that the flashes of the lamp are in substantial synchronism with the passing divisions, then the disc will apparently be standing still. If the reed is out of tune, and for example, sharp, the divisions of the disc will apparently be moving slightly in one direction or the other, depending upon the direction of rotation of the disc; and if, for example, the disc is rotating in a clockwise direction and the reed is sharp, the flashes of the lamp will recur faster than the divisions are passing the eye piece, and the disc will apparently be rotating slowly in an anti-clockwise direction.

Having ascertained that the reed is sharp or flat, then the tuner will apply either one of the tools 41 to the face of the reed to correct its inaccuracy and bring it into tune.

Referring again to Figs. 6 and 12, whenever the driven clutch member tends to drop back below the speed that it should have, the centrifugal force will be insufficient to hold the contact finger 80 out, and with its contact point 86 removed from the contact point 87. These contacts will therefore come together and increase the flow of current through the coil 78, which will drive the shaft 6 at a slightly increased speed.

If the driven clutch member tends to go too fast, the centrifugal contact finger will move out and break the circuit at the contacts 86 and 87.

It is understood that the embodiment of the invention described herein is only one of the many embodiments this invention may take, and I do not wish to be limited in the practice of the invention, nor in the claims, to the particular embodiment set forth.

What I claim is:

1. In a stroboscopic tuning apparatus for tuning a vibrator for sounding a note, the combination of a frame, a plurality of rotary members mounted for rotation on the said frame, each of said rotary members having a plurality of circumferentially spaced divisions, means for rotating said rotary members at distinctive speeds so that the said divisions on each rotary member will pass an observation point at a predetermined frequency corresponding to a certain note of a musical scale, an electric circuit including a lamp of neon type for casting rays onto the said rotary members at the observation point, and sound-sensitive means controlled by the frequency of the vibrator for flashing the lamp at the same frequency as the vibrator that is to be tuned.

2. In a stroboscopic tuning apparatus for tuning a vibrator for sounding a note, the combination of a spider, means for supporting the spider so that it is capable of being rotated at will, a plurality of rotary discs mounted for rotation on the said spider, each of said discs having a plurality of circumferentially spaced divisions, means for rotating said rotary discs at distinctive speeds so that the said divisions on each disc may pass an observation point at a predetermined frequency corresponding to a certain note of a musical scale, an electric circuit including a lamp of neon type for casting rays onto the said discs at the observation point, and sound-sensitive means controlled by the frequency of the vibrator for flashing the lamp at the same frequency as the vibrator that is to be tuned.

3. In a stroboscopic tuning apparatus for tuning vibrators for sounding a note, a plurality of rotary discs, each disc having zones thereon at different distances from the axis of rotation of the discs, each of said zones having equidistant divisions thereon, an observation chute with means for bringing the same into alignment with any zone of any of the said discs, an electric circuit including a lamp of neon type for casting rays onto the said zones of the discs and adjacent the observation chute, means for rotating the discs so that the divisions of each zone of each disc may pass the observation chute at a frequency the same as a predetermined note of a musical scale, and means controlled by the sound from the vibrator to be tuned, for flashing the lamp at the frequency of the vibrator.

4. In a stroboscopic tuning apparatus for tuning vibrators of musical instruments, the combination of a frame, a spider rotatably mounted on the frame, a plurality of rotary discs mounted on the spider and disposed circumferentially about the axis of rotation of the spider, means for rotating all of said discs in unison, each of said discs having a plurality of circumferential zones and each of the zones having equidistant divisions, an electric circuit including a lamp of neon type located at a relatively fixed observation point, said parts cooperating so that the different discs may be brought into alignment with the lamp and the observation point, and the speed of driving being such that the divisions on the zones of said discs may pass the observation point at a predetermined frequency the same as a note of a musical scale, and sound-sensitive means actuated by the note sounded by the musical instrument for flashing the lamp at the same frequency as the vibrator that is to be tuned.

5. A stroboscopic tuning apparatus constructed as described in claim 4, having means for movably supporting the chute to enable the same to be shifted into alignment with the different zones of the disc that is being held at the observation point.

6. In a stroboscopic tuning apparatus for tuning the vibrator of a musical instrument, the combination of a frame, a spider rotatably supported on the frame, a plurality of rotary discs rotatably mounted on the spider, an eye piece supported on the frame, means for setting the spider so that any of the discs may be substantially in line with the eye piece, each of said discs having a plurality of zones and each zone having a plurality of equidistant divisions, means for driving all of the discs in unison at individually distinctive speeds so that the divisions of any disc may move past the eye piece at a frequency the same as that of a certain note of a musical scale, a flashing lamp of neon type associated with the eye piece, and means including sound-sensitive means for flashing the lamp at the same frequency as the vibrator that is to be tuned.

7. In a stroboscopic tuning apparatus for tuning vibrators of musical instruments, the combination of a frame, a spider mounted on the frame, a plurality of rotary discs mounted on the spider and disposed circumferentially about the axis of the spider, each of said discs having a plurality of zones and each zone having equidistant divisions, a relatively fixed eye piece supported on the said frame, means for holding the spider in a fixed position with any one of the discs opposite to the eye piece, a shaft coaxial with the spider, means for driving said shaft at a substantially uniform speed, and means for driving the disc at different distinctive speeds from the said shaft and so that the divisions of a zone of any of said discs may pass the eye piece at a frequency the same as that of a note of a musical scale, a flashing lamp mounted so as to illuminate the surface of the disc that is located opposite the eye piece, and means for flashing the lamp at the same frequency as the vibrator that is to be tuned.

8. In a stroboscopic tuning apparatus for tuning vibrators of musical instruments, the combination of a frame, a spider mounted on the frame, a plurality of rotary discs mounted on the spider and disposed circumferentially about the axis of the spider, each of said discs having a plurality of zones and each zone having equidistant divisions, a relatively fixed eye piece supported on the said frame, means for holding the spider in a fixed position with any one of the discs opposite to the eye piece, a shaft coaxial with the spider, means for driving said shaft at a substantially uniform speed, means for driving the discs at different distinctive speeds from the said shaft and so that the divisions of a zone of any of said discs may pass the eye piece at a frequency the same as that of a note of a musical scale, a flashing lamp mounted so as to illuminate the surface of the disc that is located opposite the eye piece, means for flashing the lamp at the same frequency as the vibrator that is to be tuned, and means for supporting the eye piece to enable the same to be held in different positions opposite the different zones of the disc that is located opposite the eye piece.

9. A stroboscopic tuning apparatus contsructed as described in claim 7, and in which the driving means for driving the disc from the said shaft consists of a belt pulley on the shaft and belt pulleys carried respectively by the said discs, the belt pulleys of the discs having diameters enabling the discs to be rotated at different speeds.

VICTOR H. SEVERY.